US009963305B2

United States Patent
Gervais et al.

(10) Patent No.: US 9,963,305 B2
(45) Date of Patent: May 8, 2018

(54) TANK PRESSURIZATION CONTROL FOR AIR CARTS

(71) Applicant: CNH Industrial Canada, Ltd., Saskatoon (CA)

(72) Inventors: Joel John Octave Gervais, Saskatoon (CA); James Wayne Henry, Saskatoon (CA); Ethan Curtis Stephen Bent, Saskatoon (CA); Stewart Joseph Millie, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 6 days.

(21) Appl. No.: 14/932,345

(22) Filed: Nov. 4, 2015

(65) Prior Publication Data

US 2016/0120103 A1  May 5, 2016

Related U.S. Application Data

(60) Provisional application No. 62/075,149, filed on Nov. 4, 2014.

(51) Int. Cl.
*B65G 53/12* (2006.01)
*B65G 53/66* (2006.01)
(Continued)

(52) U.S. Cl.
CPC .............. *B65G 53/66* (2013.01); *A01C 7/081* (2013.01); *A01C 7/102* (2013.01); *B65G 53/22* (2013.01)

(58) Field of Classification Search
CPC ......... B65G 53/16; B65G 53/22; B65G 53/12
(Continued)

(56) References Cited

U.S. PATENT DOCUMENTS 1,559,666 A * 11/1925 Bernier .................. E04F 21/12
222/241
2,734,782 A * 2/1956 Galle ...................... B65G 53/22
266/182
(Continued)

FOREIGN PATENT DOCUMENTS

GB           759040 A    10/1956

*Primary Examiner* — Joseph Dillon, Jr.
(74) *Attorney, Agent, or Firm* — Rebecca L. Henkel; Rickard K. DeMille (57) ABSTRACT

A pneumatic distribution system to distribute a granular product to an agricultural implement includes a first pressure sensor, a second pressure sensor, a valve, and a controller. The first pressure sensor is fluidly coupled to a granular product storage tank and outputs a first signal indicative of a first static pressure in the storage tank. The second pressure sensor is fluidly coupled to a primary line that pneumatically delivers the granular product to the agricultural implement by guiding an air stream from a first section with a larger cross-sectional area to a second section with a smaller cross-sectional area. The second pressure sensor outputs a signal indicative of the static pressure in the second section of the primary line. The valve is fluidly coupled between the storage tank and the primary line and selectively enables the air stream to flow from the primary line to the storage tank. The controller, which is communicatively coupled to both pressure sensors and the valve, instructs the valve to enable the air stream to flow from the primary line to the storage tank until the first static pressure is greater than the second static pressure by a threshold amount.

11 Claims, 5 Drawing Sheets

(51) Int. Cl.
  *B65G 53/22* (2006.01)
  *A01C 7/08* (2006.01)
  *A01C 7/10* (2006.01)

(58) Field of Classification Search
  USPC ............. 406/15, 30, 63, 128, 146, 195, 144; 138/45
  See application file for complete search history.

(56) References Cited

U.S. PATENT DOCUMENTS

| | | | | |
|---|---|---|---|---|
| 2,919,159 A * | 12/1959 | Lacroix | ................. | B65G 53/00 |
| | | | | 406/137 |
| 3,295,895 A * | 1/1967 | Latham, Jr. | ............ | B65G 53/00 |
| | | | | 406/125 |
| 3,432,208 A * | 3/1969 | Draper | ................... | B65G 53/22 |
| | | | | 406/132 |
| 3,490,654 A * | 1/1970 | Fischer | ................. | B65G 53/66 |
| | | | | 111/130 |
| 3,671,079 A * | 6/1972 | Huffaker | ................ | B65G 53/12 |
| | | | | 406/127 |
| 3,693,840 A * | 9/1972 | Starr | ........................ | A21C 9/04 |
| | | | | 406/129 |
| 3,893,655 A * | 7/1975 | Sandiford | ............. | B01F 3/1271 |
| | | | | 366/114 |
| 4,280,109 A | 7/1981 | Fischer | | |
| 4,502,819 A * | 3/1985 | Fujii | ..................... | B65G 53/22 |
| | | | | 406/132 |
| 4,521,139 A * | 6/1985 | Kretschmer | ........... | B65G 53/66 |
| | | | | 406/142 |
| 4,592,679 A * | 6/1986 | Boiting | .................. | B65G 53/22 |
| | | | | 406/127 |
| 4,662,799 A * | 5/1987 | Paul | ....................... | B65G 53/12 |
| | | | | 406/14 |
| 4,697,962 A | 10/1987 | Dunbar et al. | | |
| 4,883,390 A * | 11/1989 | Reintjes | ................. | B65G 53/12 |
| | | | | 406/124 |
| 5,018,910 A * | 5/1991 | Weiss | ........................ | B05B 5/12 |
| | | | | 406/108 |
| 5,071,289 A * | 12/1991 | Spivak | ................... | B65G 53/22 |
| | | | | 406/11 |
| 5,350,257 A | 9/1994 | Newbolt et al. | | |
| 5,397,062 A * | 3/1995 | Krambrock | .............. | G05D 7/01 |
| | | | | 137/494 |
| 5,494,381 A * | 2/1996 | Heyl | ....................... | B65G 53/12 |
| | | | | 406/14 |
| 5,558,474 A * | 9/1996 | Wildon | ................. | B24C 7/0053 |
| | | | | 406/127 |
| 6,024,035 A | 2/2000 | Flamme | | |
| 6,079,911 A * | 6/2000 | Wangermann | ...... | A01M 7/0092 |
| | | | | 406/122 |
| 6,283,679 B1 | 9/2001 | Gregor et al. | | |
| 6,287,056 B1 * | 9/2001 | Szikszay | ................ | B65G 53/12 |
| | | | | 406/127 |
| 7,101,120 B2 | 9/2006 | Jurkovich | | |
| 8,061,295 B2 * | 11/2011 | Zimmerman | ......... | E01C 23/166 |
| | | | | 118/308 |
| 8,425,160 B2 * | 4/2013 | Curie | ...................... | B65D 88/32 |
| | | | | 166/162 |
| 8,504,310 B2 * | 8/2013 | Landphair | .............. | A01C 7/081 |
| | | | | 702/45 |
| 8,522,700 B2 | 9/2013 | Landphair | | |
| 9,086,164 B2 * | 7/2015 | Mortzheim | ............. | F16K 24/00 |
| 2008/0044238 A1 * | 2/2008 | Delves | ................... | B65G 53/22 |
| | | | | 406/130 |

* cited by examiner

TANK PRESSURIZATION CONTROL FOR AIR CARTS

CROSS REFERENCE TO RELATED APPLICATIONS

This application claims priority from and the benefit of U.S. Provisional Patent Application No. 62/075,149, entitled "TANK PRESSURIZATION CONTROL FOR AIR CARTS," filed Nov. 4, 2014, which is hereby incorporated by reference in its entirety.

BACKGROUND

The invention relates generally to an agricultural product distribution system, and more particularly, to controlling the pneumatic distribution of a granular product.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. The air cart may generally include a seed storage tank (e.g., a pressurized tank), an air source (e.g., a blower), and a metering assembly. More specifically, the granular product may be gravity fed from the storage tank into the metering assembly, which distributes a desired flow rate of the granular product to each of the row units. For example, the air source may generate an air stream and the metering assembly may control flow of seeds into the air stream such that the seeds are entrained in the air stream. The air stream may then be supplied to each of the row units via primary lines fluidly coupled between the metering assembly and the row units, thereby delivering the granular product to each of the row units. As such, the desired seed deposition may be facilitated by maintaining a desired relationship between the static pressure in the storage tank and the static pressure in the primary line. When the difference between the static pressure in the storage tank and the static pressure in the primary line are not in the desired range, it may interfere with the seed flow, thereby providing an undesirable seed flow rate to the row units.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a pneumatic distribution system to distribute a granular product to an agricultural implement includes a first pressure sensor, a second pressure sensor, a valve, and a controller. The first pressure sensor is configured to be fluidly coupled to a granular product storage tank and outputs a first signal indicative of a first static pressure in the storage tank. The second pressure sensor is configured to be fluidly coupled to a primary line that pneumatically delivers the granular product to the agricultural implement by guiding an air stream from a first section with a larger cross-sectional area to a second section with a smaller cross-sectional area. The second pressure sensor outputs a signal indicative of the static pressure in the second section of the primary line. The valve is configured to be fluidly coupled between the storage tank and the primary line and selectively enables the air stream to flow from the primary line to the storage tank. The controller, which is communicatively coupled to both pressure sensors and the valve, instructs the valve to enable the air stream to flow from the primary line to the storage tank until the first static pressure is greater than the second static pressure by a threshold amount.

In another embodiment, a pneumatic valve used in an agricultural product distribution system includes a fan inlet, a tank outlet, a shuttle, a control pressure inlet, and a diaphragm. The fan inlet is configured to be fluidly coupled to an air source that supplies an air stream into a primary line. The primary line facilitates distribution of a granular product to an agricultural implement by guiding the air stream from a first section of the primary line to a second section of the primary line, wherein the first section has a larger cross-sectional area than the second section. The tank outlet is configured to be fluidly coupled to a storage tank that stores the granular product and to facilitate flow of the granular product to the second section of the primary line. The shuttle includes a shuttle hole. The control pressure inlet is configured to be fluidly coupled to the second section of the primary line or to the meter housing. The diaphragm has a first side and a second side. The first side is coupled to the shuttle and is exposed to the static pressure in the storage tank through the tank outlet. The second side of the diaphragm is exposed to the static pressure in the second section of the primary line or the meter housing through the control pressure inlet. The diaphragm is configured to move toward the tank outlet such that the shuttle hole is aligned with the fan inlet when the static pressure in the storage tank is not greater than the static pressure in the second section of the primary line or the meter housing by a threshold amount.

In a further embodiment, a pneumatic distribution system configured to distribute a granular product to an agricultural implement, wherein the pneumatic distribution system includes a first pressure sensor, a second pressure sensor, a valve, and a controller. The first pressure sensor is configured to be fluidly coupled to a storage tank that stores the granular product. The first pressure sensor is configured to output a first signal indicative of a first static pressure in the storage tank. The second pressure sensor is configured to be fluidly coupled to a meter housing. The second pressure sensor is configured to output a second signal indicative of a second static pressure in the meter housing. The valve is configured to be fluidly coupled between the storage tank and the primary line. The valve is configured to selectively enable the air stream to flow from the primary line to the storage tank. The controller is communicatively coupled to the first pressure sensor, to the second pressure sensor, and to the valve. The controller is configured to instruct the valve to enable the air stream to flow from the primary line into the storage tank until the first static pressure is greater than the second static pressure by a threshold amount.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally an agricultural product distribution system may include a towable agricultural implement to deposit a granular product into the soil. As used herein, the granular product may be any suitable particulate material that is desired to be deposited into the ground, such as various types of seeds and fertilizers. However, to simplify the following discussion, the product will be described as seeds. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a metering assembly on the air cart may pneumatically distribute the granular product to the row units. For example, the metering assembly may control output of the granular product from a storage tank into an air stream, which is then delivered to the row units via pneumatic lines (e.g., including a primary line coupled to the air cart) that fluidly connect the metering assembly to the row units.

Over its length, the cross sectional area of the primary line may change (e.g., shrinking) As such, pressure variations in the primary line may be induced by the Venturi effect. Differences in the static pressure in the storage tank and the static pressure in the primary line, as a result of the Venturi effect or other factors, may have an undesirable effect on the flow rate of the granular product out of the storage tank and into the primary line. For example, when the static pressure in the storage tank is more than the desired value above the static pressure at the change in cross sectional area (e.g., Venturi section), the granular product may flow out of the tank at a higher rate than desired. Alternatively, when the static pressure at the change in cross sectional area (e.g., Venturi section) exceeds the static pressure in the storage tank, the granular product may flow out of the storage tank at a lower rate than desired.

Accordingly, as will be described in more detail below, embodiments described herein may improve the product flow consistency of the product distribution system by controlling static pressure in the product distribution system (e.g., in the storage tank). For example, one embodiment discusses a pneumatic distribution to distribute a granular product to an agricultural implement, which includes at least two pressure sensors, a valve, and a controller. A first pressure sensor is fluidly coupled to a granular product storage tank and outputs a first signal indicative of a first static pressure in the storage tank. A second pressure sensor is fluidly coupled to a primary line that pneumatically delivers the granular product to the agricultural implement by guiding an air stream from a first section with a larger cross-sectional area to a second section with a smaller cross-sectional area, and then to a larger cross-sectional area section that provides the product to the row units. The second pressure sensor outputs a second signal indicative of a second static pressure in the second section of the primary line. In addition, or as an alternative to the second pressure sensor, a third pressure sensor may be fluidly coupled to a meter housing. The third pressure sensor outputs a third signal indicative of a third static pressure in the meter housing (e.g., the static pressure at an edge of a meter roller). In addition, or as an alternative to the second pressure sensor, a fourth pressure sensor may be fluidly coupled to a secondary line that is used to pressurize the storage tank. The fourth pressure sensor outputs a fourth signal indicative of a fourth static pressure in the secondary line. It should be understood, however, that any combination of sensors may be possible. For example, the disclosed techniques may utilize the first and/or fourth pressure sensors and the second and/or third pressure sensors. The valve is fluidly coupled between the storage tank and the primary line and selectively enables the air stream to flow from the primary line to the storage tank. The controller, which communicates with both pressure sensors and the valve, instructs the valve to enable the air stream to flow from the primary line to the storage tank until the first static pressure is greater than the second static pressure by a threshold amount.

Figure 1:
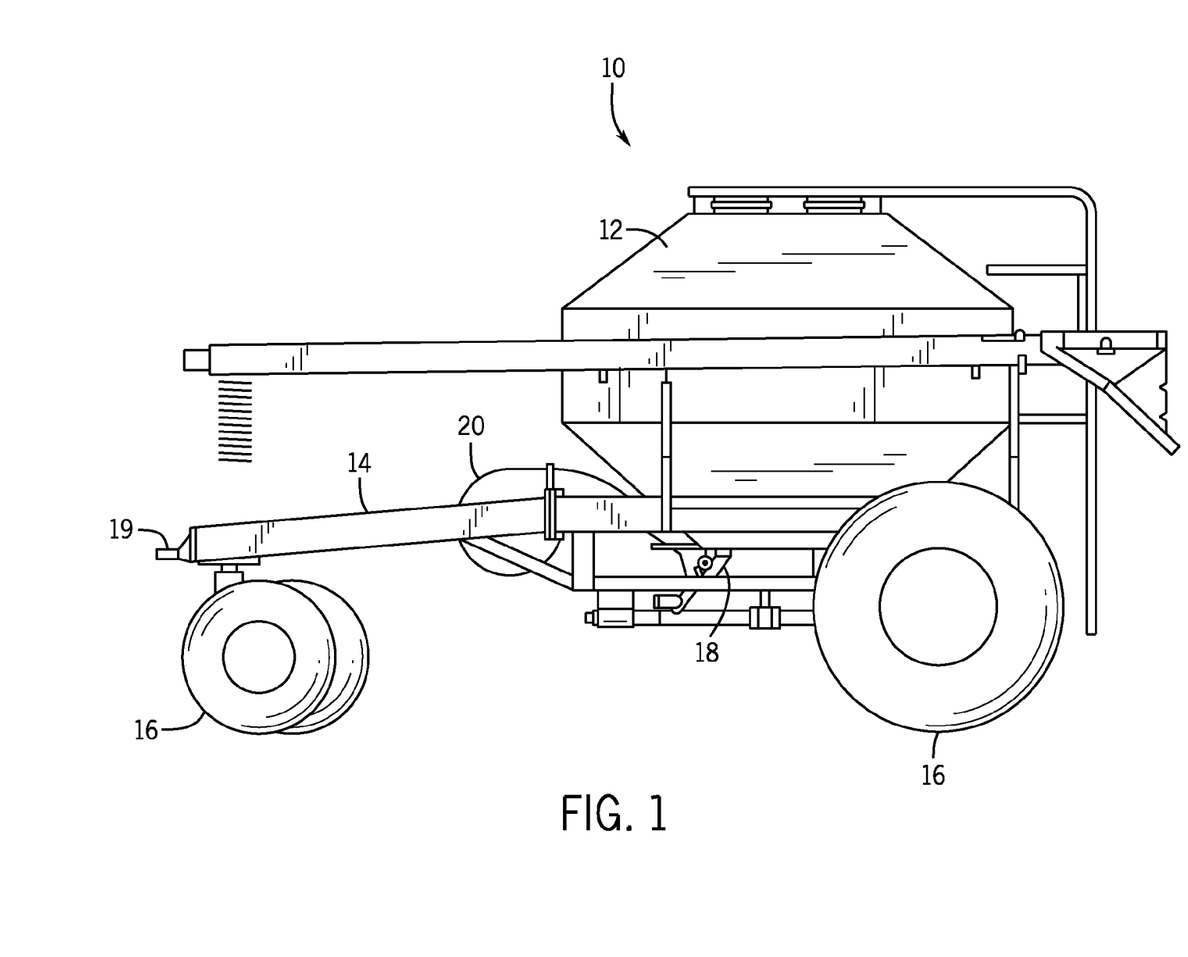
FIG. 1 is a side view of an air cart, including an agricultural product distribution system, in accordance with an embodiment.

To help illustrate, a side view of an air cart 10 that may be used in conjunction with a towable agricultural implement to deposit seeds into the soil is shown in FIG. 1. More specifically, the air cart 10 may be used to centrally store seeds and distribute the seeds to the agricultural implement. Accordingly, in the illustrated embodiment, the air cart 10 includes a storage tank 12, a frame 14, wheels 16, a metering assembly 18, and an air source 20. In the depicted embodiment, the air cart frame 14 may be coupled to the agricultural implement or an off-road work vehicle via a hitch 19. As such, the wheels 16 may contact the soil surface to enable the air cart 10 to be towed.

Additionally, the storage tank 12 may centrally store the seeds before distribution. In some embodiments, the storage tank 12 may include multiple compartments for storing various flowable granular products 26. For example, one compartment may include seeds, such as canola or mustard, and another compartment may include a dry fertilizer. In such embodiments, the air cart 10 may distribute the seeds, the fertilizer, or a mixture thereof to the agricultural implement.

Furthermore, as depicted, the metering assembly 18 is coupled to the bottom of the storage tank 12. More specifically, the metering assembly 18 may enable seeds stored in the storage tank 12 to be gravity fed into the metering assembly 18. The metering system 18 may then control the flow of seeds into an air stream generated by the air source 20, thereby controlling seed distribution to the row units for deposition into the soil. In some embodiments, the air source 20 may be a pump or blower powered by an electric or hydraulic motor, for example.

Figure 2:
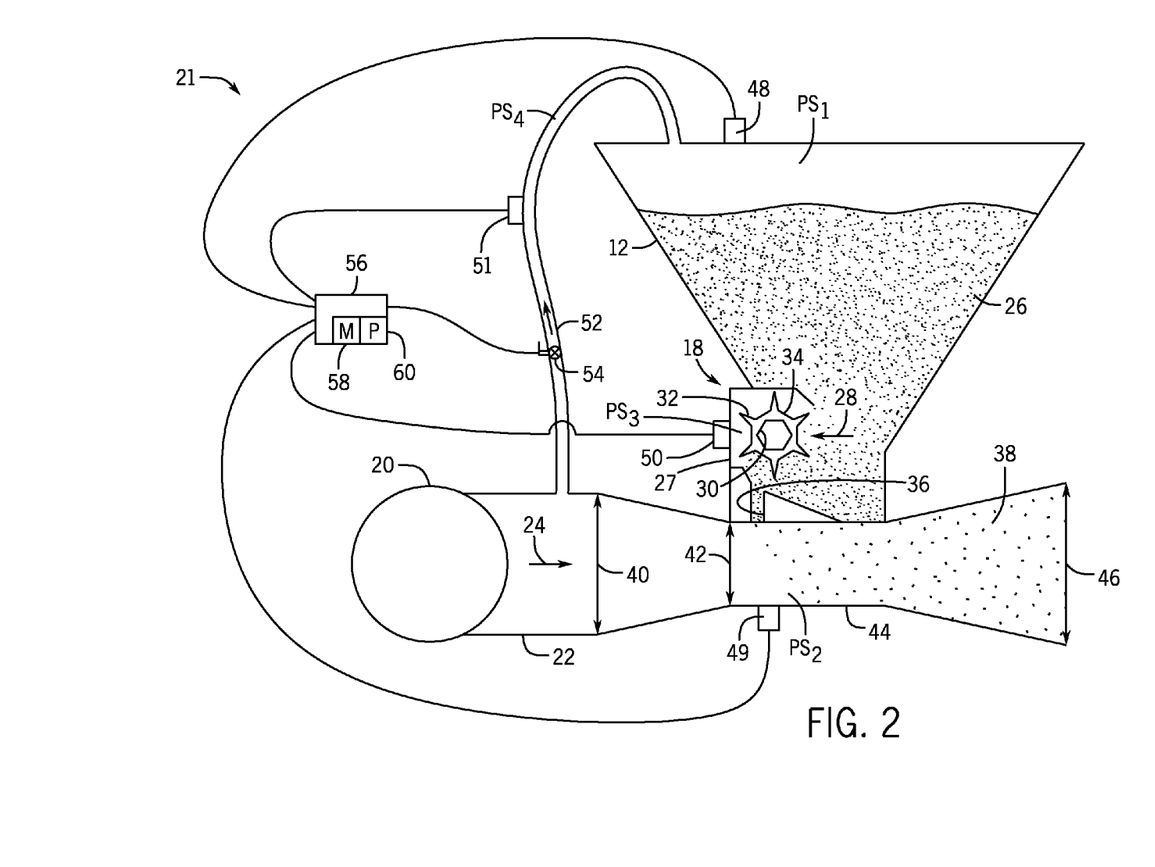
FIG. 2 is a schematic view of the agricultural product distribution system of FIG. 1, in accordance with an embodiment.

To more clearly illustrate, a schematic view of a pneumatic distribution system 21 is shown in FIG. 2. As illustrated, the pneumatic distribution system 21 includes the air source 20, the storage tank 12, and the metering assembly 18. More specifically, a primary line 22 is used to guide an air stream 24 generated by the air source 20 past the metering assembly 18. It should be understood that a system having multiple storage tanks 12 and metering assemblies may have multiple primary lines 22. Additionally, the metering assembly 18 includes a meter housing 27 and a meter roller 28 to control the flow of seeds 26 into the air stream 24. Although only one meter roller 28 is depicted, in other embodiments the metering assembly 18 may include multiple meter rollers 28 disposed adjacent to one another along a longitudinal axis.

As depicted, the meter roller 28 includes an interior cavity 30, which may receive a shaft that drives the meter roller 28 to rotate. In the depicted embodiment, the cavity 30 has a hexagonal cross section. However, alternative embodiments may include various other cavity configurations (e.g., triangular, square, keyed, splined, etc.). In some embodiments, the shaft may be coupled to a drive unit, such as an electric or hydraulic motor, to rotate the meter roller 28. Additionally or alternatively, the meter roller 28 may be coupled to a wheel 16 by a gear assembly such that rotation of the wheel 16 drives the meter roller 28 to rotate. Such a configuration automatically varies the rotation rate of the meter roller 28 based on the speed of the air cart 10.

Additionally, the meter roller 28 may include multiple flutes 32 and recesses 34. The number and geometry of the flutes 32 may be selected to accommodate the seeds 26 being distributed. For example, in the illustrated embodiment, the meter roller 28 includes six flutes 32 and a corresponding number of recesses 34. In other embodiments, the meter roller 28 may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 may be selected to accommodate the agricultural product 26 within the storage tank 12. For example, a meter roller 28 having deeper recesses 34 and fewer flutes 32 may be employed for larger seeds, while a meter roller having shallower recesses 34 and more flutes 32 may be employed for smaller seeds. Other parameters such as flute pitch (i.e., angle of the flute relative to a longitudinal axis) and flute angle (i.e., angle of the flute relative to a radial axis) may also be varied in alternative embodiments.

For a particular meter roller 28 configuration, the rotation rate of the meter roller 28 may control the flow of the seeds 26 into the air flow 24. For example, as the meter roller 28 rotates, seeds 26 held in a recess 34 of the meter roller 28 are transferred through an outlet 36 into the primary line 22. The seeds 26 may then be entrained in the air stream 24, thereby forming an air/seed mixture 38. The mixture 38 may then flow to the row units of the agricultural implement via pneumatic lines, where the seeds and/or fertilizer are deposited within the soil.

As depicted, the primary line 22 converges from a first cross-sectional area 40 to a second cross-sectional area 42 before reaching the outlet 36, and then diverges to a third cross-sectional area 46 once the air/seed mixture 38 is formed. Differences in the static pressure in the storage tank 12, the static pressure in the meter housing 27, and the static pressure in the primary line 22 may have an undesirable effect on the flow rate of seeds 26 out of the storage tank 12 and into the primary line 22. Changes in cross-sectional area of the primary line 22 may create pressure variations in the primary line 22 (e.g., in a Venturi section 44) induced by the Venturi effect. Variations in the static pressure of the storage tank 12, the static pressure in the meter housing 27, and the static pressure of the primary line 22 may also result from factors other than the Venturi effect. For example, when the static pressure in the storage tank 12 is more than a desired value above the static pressure in the meter housing 27 or the static pressure in the primary line 22, seeds 26 may flow out of the storage tank 12 at a higher rate than desired. Alternatively, when the static pressure in the primary line 22 or the static pressure in the metering section exceeds the static pressure in the storage tank 12, seeds 26 may flow out of the storage tank 12 at a rate lower than desired.

As such, one way to maintain predictable flow of seeds 26 into the primary line 22 is to measure and control the pressure differential across the meter roller 28 (e.g., by monitoring the static pressure PS1 in the storage tank 12, and the static pressure PS2 in the primary line 22 and/or the static pressure PS3 in the meter housing 27). More specifically, a first pressure sensor 48 is fluidly coupled to the storage tank 12 to facilitate determining PS1, a second pressure sensor 49 is fluidly coupled to the primary line 22 to facilitate determining PS2, and a third pressure sensor 50 is fluidly coupled to the to the meter housing 27 (e.g., disposed inside the meter housing 27 at the edge of the meter roller 28). If a pneumatic distribution system 21 includes more than one primary line 22, each primary line 22 may have its own pressure sensor 49. One advantage of having a pressure sensor fluidly coupled to the meter housing 27 (rather than a pressure sensor fluidly coupled to the primary line 22) is that in configurations with multiple primary lines 22, only one pressure sensor 50 is utilized, rather than one pressure sensor 49 for each primary line 22. In some embodiments, the pneumatic distribution system may include a fourth pressure sensor 51 fluidly coupled to a secondary line 52 that fluidly couples the primary line 22 to the storage tank 12. The secondary line 52 facilitates adjustment of the static pressures PS1, PS2, PS3, and PS4. Each pressure sensor is configured to output a respective signal indicative of the determined pressure. Furthermore, a valve 54 fluidly coupled to the secondary line 52 may be used to enable or disable the air stream 24 from flowing through the secondary line 52 and into tank 12. As previously discussed, it should be understood that any combination of pressure sensors may be possible. For example, the pneumatic distribution system may include the first 48 and/or fourth pressure sensors 51 and the second 49 and/or third pressure sensors 50.

To facilitate measuring and controlling the static pressures PS1, PS2, PS3, and PS4, a controller 56 may be communicatively coupled to the first pressure sensor 48, the second pressure sensor 49, the third pressure sensor 50, the fourth pressure sensor 51, and the valve 54. For example, the controller 56 may determine PS1 based on signals received from the first pressure sensor 48, PS2 based on signals received from the second pressure sensor 49, PS3 based on the signals received from the third pressure sensor 50, PS4 based on the signals received from the fourth pressure sensor 51, and/or control operation of the valve 54 by sending instructions to the valve 54. In one embodiment, the valve shown in FIG. 2 may be operated with a solenoid. Accordingly, the controller 56 may include a processor 60 and memory 58. In some embodiments, the processor 60 may include one or more general purpose processors, one or more application specific integrated circuits, one or more field programmable gate arrays, or the like. Additionally, the memory 58 may be any tangible, non-transitory, computer readable medium that is capable of storing instructions executable by the processor 60 and/or data that may be processed by the processor 60. In other words, the memory 58 may include volatile memory, such as random access memory, or non-volatile memory, such as hard disk drives, read only memory, optical disks, flash memory, and the like.

More specifically, the controller 56 may instruct the valve 54 to adjust its position (e.g., orientation) to control the static pressures such that the static pressure PS1 in the storage tank 12 and/or that static pressure PS4 in the secondary line 52 is greater than the static pressure PS2 in the primary line 22 and/or the static pressure PS3 at the meter housing 27 by a desired threshold value. For example, the desired difference range between the static pressure PS1 in the storage tank 12 or that static pressure PS4 in the secondary line 52 and the static pressure PS2 in the Venturi section 44 or the static pressure PS3 in the meter housing 27 may be between 0.125 kPa and 1.246 kPa or between 0.125 kPa and 0.249 kPa.

It should be understood, however, that the embodiment described above is merely one embodiment and that other configurations may be possible. For example, other embodiments may only have a pressure sensor 48 fluidly coupled to the storage tank 12 and a pressure sensor 49 fluidly coupled to the primary line. Still other embodiments may only have a pressure sensor 48 fluidly coupled to the storage tank 12 or pressure sensor 51 fluidly coupled to the secondary line 52 and a pressure sensor 50 fluidly coupled to the meter housing 27. Yet another embodiment may have a pressure sensor 49 fluidly coupled to the primary line and a pressure sensor fluidly coupled to the meter housing 27. In each of these embodiments, the described techniques (e.g., operating a valve 54 on a secondary line 52 based on a pressure differential) may be used to control the pressures in the system such that the desired relationship between measured pressures is achieved and maintained. For example, the valve 54 may be operated such that a measured pressure upstream of the meter housing 27 is maintained at our around a threshold amount above a measured pressure downstream of the meter housing 27.

Figure 3:
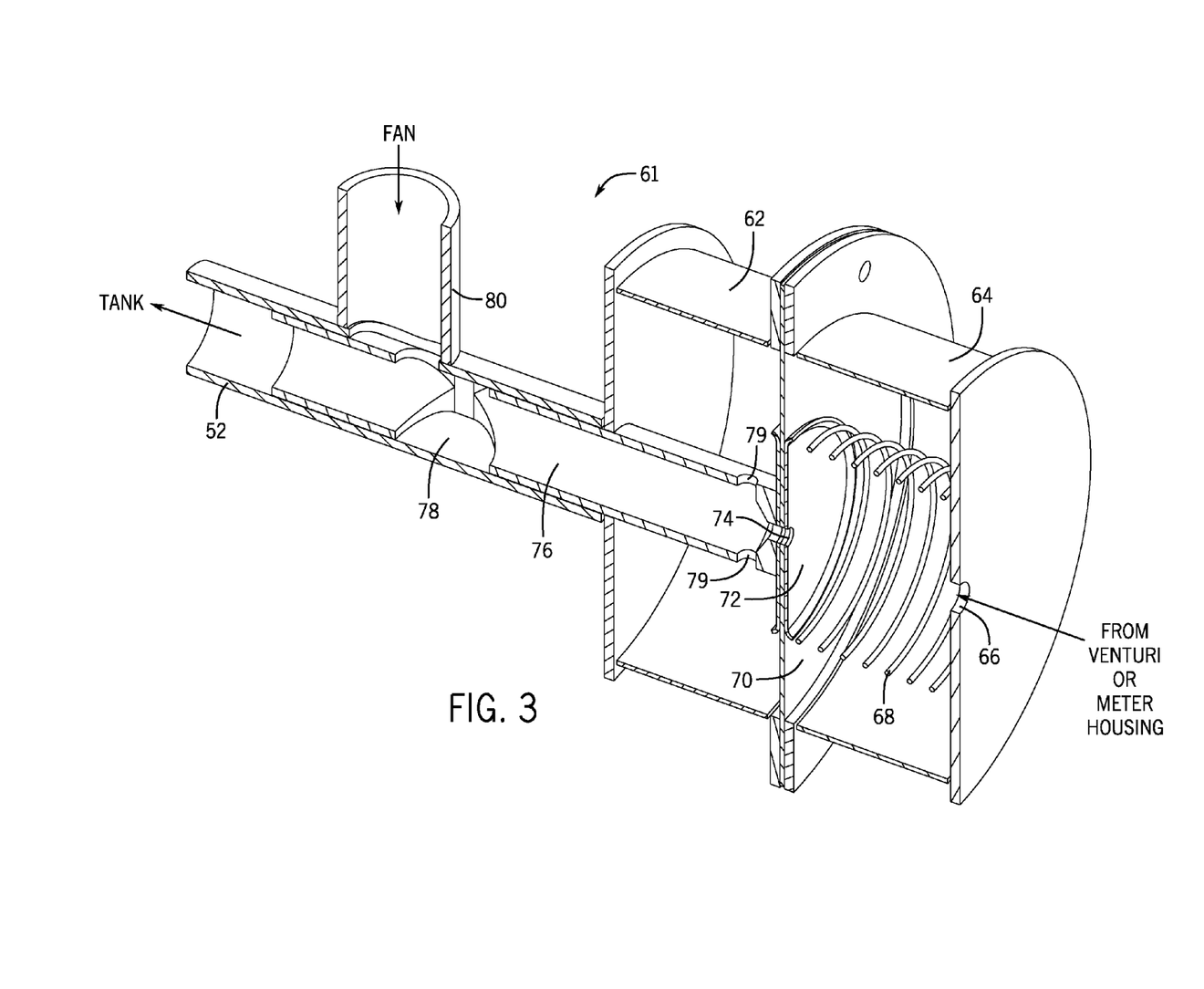
FIG. 3 is a cross-sectional perspective view of an embodiment of a valve that may be used in the agricultural product distribution system of FIG. 1.
Figure 4:
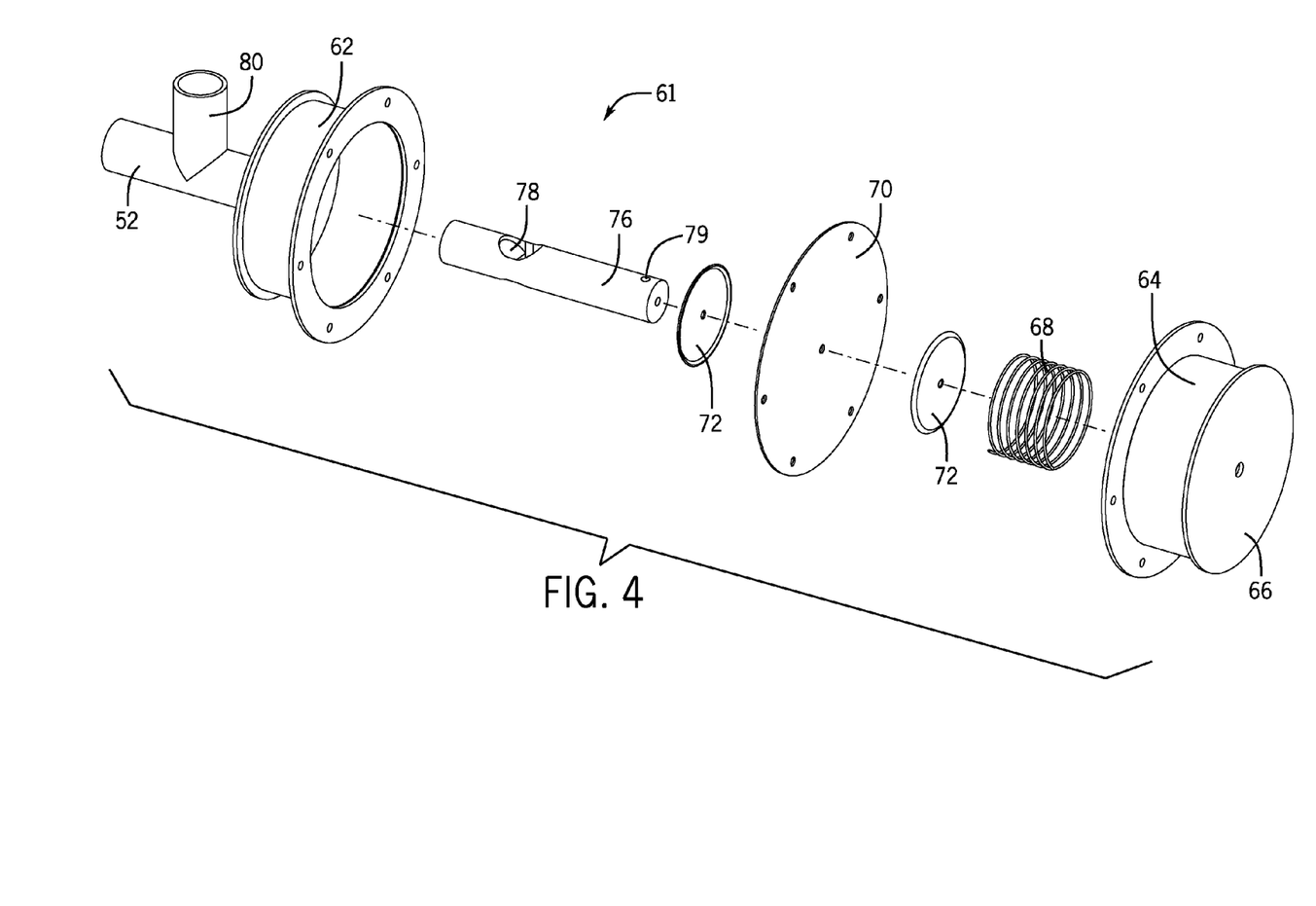
FIG. 4 is an exploded view of the valve of FIG. 3.
Figure 5:
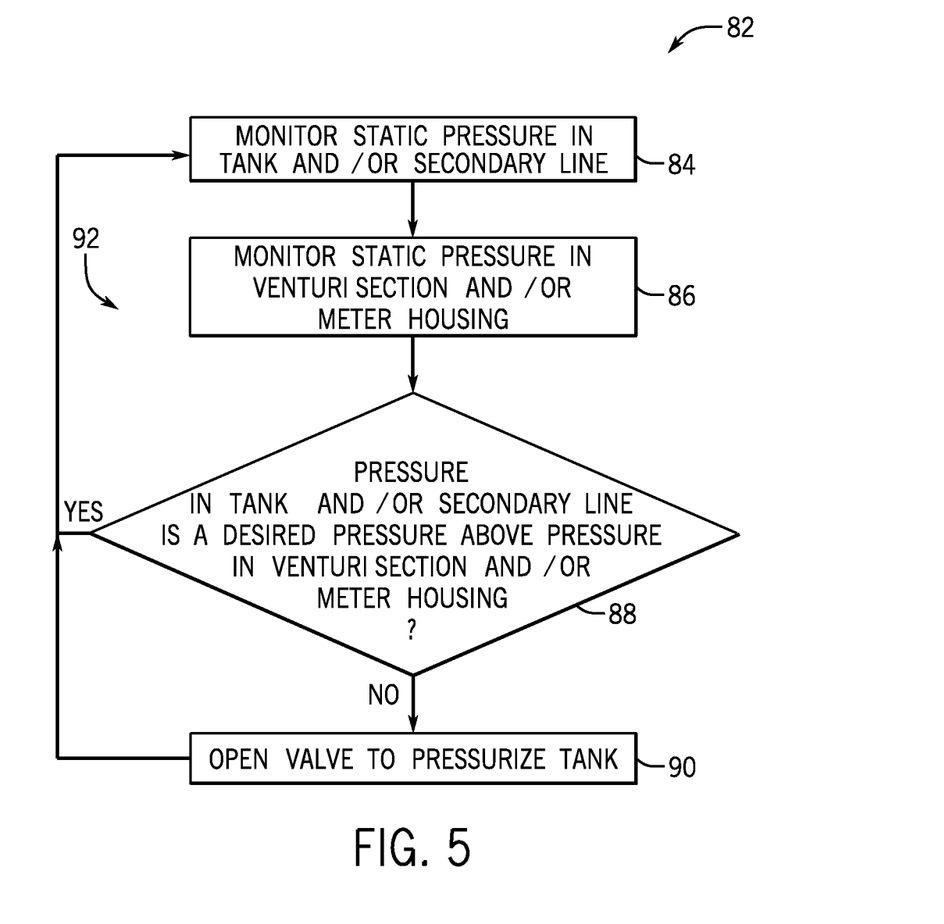
FIG. 5 is a flow chart of a process for controlling the pressure in the agricultural product distribution system, in accordance with an embodiment.

A perspective view of an embodiment of a valve 61 is shown in FIG. 3. Valve 61 is an automatic valve. Unlike the valve 54 shown in FIG. 2, the valve 61 shown in FIG. 3 is not operated by a controller. It should be understood that the systems and methods described herein could be implemented by an electronically controlled valve, an automatic valve, or any number of any other valve types. As depicted, the valve 61 includes a first housing 62, a second housing 64, a control pressure inlet 66, a spring 68, a diaphragm 70, washers 72, a bolt hole 74, a shuttle 76 having a first shuttle hole 78 and second shuttle holes 79, and a fan inlet 80. More specifically, in the depicted embodiment, the first housing 62 and second housing 64 are attached via flanges such that the diaphragm 70 is sandwiched between them. Additionally, as depicted, the second housing 64 includes the control pressure inlet 66, which may be fluidly coupled to the Venturi section 44 or the meter housing 27. The spring 68 is disposed inside the second housing 64 such that the spring 68 is substantially coaxial with the second housing 64. The spring 68 may be selected such that the spring constant of the spring 68 applies a force that corresponds to the desired threshold difference between the static pressure PS4 in the secondary line or the static pressure PS1 in the storage tank 12 (which should be similar) and the static pressure PS2 in the primary line 22 or the static pressure PS3 in the meter housing 27. More specifically, the spring 68 presses against the back face of second housing 64 at one end and against a first washer 72 at the opposite end, thereby urging the diaphragm 70 toward the first housing 62 as the diaphragm 70 is exposed to PS2 or PS3 (e.g., pressure in the Venturi section 44 or the pressure in the meter housing 27) through the control pressure inlet 66.

Furthermore, as depicted, the diaphragm 70 is sandwiched by the first washer 72 on one side and a second washer 72 on the other. The bolt hole 74 in the diaphragm 70 aligns with the holes in the washers 72 to enable a bolt to hold the diaphragm 70, the washers 72, and the shuttle 76 together. A shuttle 76 with a first shuttle hole 78 and second shuttle holes 79 rest against the second washer 72. The air in the shuttle 76 is under PS1 (e.g., the pressure in the storage tank 12) or PS4 (e.g., the pressure in the secondary line) and flows into the first housing 62 through second shuttle holes 79, exposing the diaphragm to PS1 (e.g., the pressure in the storage tank 12) or PS4 (e.g., the pressure in the secondary line). It should be understood that though the shuttle 76 is shown with two circular second shuttle holes 79, there could be any number of second shuttle holes 79, and the second shuttle holes 79 could be of any shape, as long as the second shuttle holes allow air to flow from the shuttle into the first housing 62. When PS2 (e.g., pressure in the Venturi section 44) or PS3 (e.g., the pressure in the meter housing 27) is greater than PS1 (e.g., the pressure in the storage tank 12) or PS4 (e.g., the pressure in the secondary line 52), air drawn from the Venturi section 44 or the meter housing 27 into the second housing 64 through the control pressure inlet 66 establishes a higher pressure in the second housing 64 than the pressure in the first housing 62. In response, the diaphragm 70 moves toward the first housing 62, pushing the shuttle 76 toward the tank inlet 52, and causing the first shuttle hole 78 to align with fan inlet 80 such that air 24 flows into the storage tank 12, thereby increasing PS1. When PS1 (e.g., the pressure in the storage tank 12) or PS4 (e.g., the pressure in the secondary line 52) is greater than PS2 (e.g., pressure in the Venturi section 44) or PS3 (e.g., the pressure in the meter housing 27) by the desired amount, the diaphragm 70 pushes against the spring 68, pulling the shuttle 76 with it, closing the valve so that air may not flow from the fan inlet 80 into the storage tank 12. The spring 68 may be selected such that the spring forces correspond to the desired threshold difference between the static pressure PS1 in the storage tank 12 or PS4 (e.g., the pressure in the secondary line 52) and the static pressure PS2 in the primary line 22 or the static pressure PS3 in the meter housing 27. The pressure in the storage tank PS1 is relieved by air flowing out of the tank outlet 36 along with the seeds 26.

To more clearly illustrate the components, an exploded view of a valve 61 is shown in FIG. 4. It should be understood that the shuttle valve 61 shown in FIGS. 3 and 4 is but one of many possible embodiments of a valve. In other words, a person of ordinary skill in the art could implement the systems and methods described herein using any number of valve types.

As described above, the controller 56 may control operation of the valve to control the static pressures PS1, PS2, PS3, and PS4. One embodiment of a process 82 for controlling the static pressures in the pneumatic distribution system is shown in FIG. 5. Generally, the process 82 includes monitoring static pressure in the storage tank (process block 84), monitoring static pressure in the Venturi section and/or the meter housing 27 (process block 86), determining whether static pressure in the storage tank is a desired pressure above the static pressure in the Venturi section and/or the meter housing 27 (decision block 88), and opening a valve to pressurize the storage tank when the static pressure in the tank is not the desired pressure above the static pressure in the venture section and/or the meter housing 27 (process block 90). In some embodiments, one or more steps in the process 82 may be implemented by instructions stored on a tangible, non-transitory, computer readable medium, such as memory 58, and executable by processing circuitry, such as processor 60.

In some embodiments, the controller 56 may monitor the static pressure SP1 in the storage tank 12 using the first pressure sensor 48 (process block 84). More specifically, the first pressure sensor 48 may output a signal indicative of the static pressure PS1 in the storage tank 12 to the controller 56. The controller 56 may also monitor the static pressure SP4 in the secondary line 52 using the fourth pressure sensor 51 (process block 84). The first pressure sensor 51 may output a signal indicative of the static pressure PS4 in the secondary line 52 to the controller 56. Similarly, the controller 56 may monitor the static pressure PS2 in the Venturi section 44 using the second pressure sensor 49 (process block 86). More specifically, the second pressure sensor 49 may output a signal indicative of the static pressure PS2 in the Venturi section 44 to controller 56. The controller 56 may monitor the static pressure PS3 in the meter housing 27 using the third pressure sensor 50 (process block 86). More specifically, the third pressure sensor 50 may output a signal indicative of the static pressure PS3 in the meter housing 27 to controller 56. Similarly, the controller 56 may monitor the static pressure PS4 in the secondary line 52 using the fourth pressure sensor 51 (process block 86). More specifically, the third pressure sensor 50 may output a signal indicative of the static pressure PS3 in the meter housing 27 to controller 56.

The controller 56 may then compare the static pressure PS1 in the storage tank 12 and/or the static pressure PS4 in the secondary line 52 to the static pressure PS2 in the Venturi section 44 and/or the static pressure PS3 in the meter housing 27 (decision block 88). When the controller 56 determines that the static pressure PS1 in the storage tank 12 and/or the static pressure PS4 in the secondary line 52 is at least a desired threshold value above the static pressure PS2 in the Venturi section 44 and/or the static pressure PS3 in the meter housing 27 (e.g., the difference between PS1 and/or PS4 and PS2 and/or PS3 is within a desired range), the controller 56 may close the valve or keep the valve 54 closed and return to monitoring the static pressure in the storage tank 12 and/or the static pressure PS4 in the secondary line 52 (arrow 92).

On the other hand, when the controller 56 determines that the static pressure PS1 in the storage tank and/or the static pressure PS4 in the secondary line is not above the static pressure PS2 in the Venturi section 44 and/or the static pressure PS3 in the meter housing 27 by the desired threshold value (e.g., difference between PS1 and/or PS4 and PS2 and/or PS3 is not within a desired range), the controller 56 may instruct the valve 54 to open. As such, the air stream 24 may flow through secondary line 52 and into tank 12, thereby increasing the static pressure PS1 in the storage tank 12 and/or the static pressure PS4 in the secondary line 52. The controller 56 may then return to monitoring the static pressure in the storage tank 12 and/or the static pressure PS4 in the secondary line 52 (arrow 92).

It should be understood that the desired threshold value or difference range may be adjusted as desired. For example, the desired difference range between the static pressure PS1 in the storage tank 12 and/or the static pressure PS4 in the secondary line 52 and the static pressure PS2 in the Venturi section 44 and/or the static pressure PS3 in the meter housing 27 may be between 0.125 kPa and 1.246 kPa or between 0.125 kPa and 0.249 kPa.

As previously discussed, other embodiments may be possible based on various pressure sensor locations. For example, similar techniques may be used to monitor and control a difference between PS1 and PS2, PS4 and PS2, PS1 and PS3, PS4 and PS3, or PS3 and PS2 such that a threshold or acceptable difference between the measured pressure upstream of the meter housing 27 and the measured pressure downstream of the meter housing is maintained.

Accordingly, embodiments described herein may provide the technical benefit of improving consistency of seed distribution in an agricultural product distribution system. More specifically, a valve may be used to adjust the static pressure in a storage tank in relation to the static pressure in a primary line to reduce the possibility of seed flow disruptions caused by unintended pressure variations. In some embodiments, the valve may open to supply air from the primary line to the storage tank, thereby increasing the static pressure of the storage tank. In this manner, the difference between the static pressure in the primary line and the static pressure within the storage tank may be maintained within a desired range.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A pneumatic distribution system configured to distribute a granular product to an agricultural implement, wherein the pneumatic distribution system comprises:

a primary line configured to pneumatically deliver the granular product to the agricultural implement by guiding an air stream from a first section of the primary line with a larger cross-sectional area to a second section of the primary line with a smaller cross-sectional area;

an air source fluidly coupled to the first section of the primary line, wherein the air source is configured to output the air stream;
a secondary line fluidly coupled between the first section of the primary line and a storage tank configured to store the granular product;
a metering assembly fluidly coupled between the storage tank and the second section of the primary line, wherein the metering assembly is configured to control output of the granular product from the storage tank into the second section of the primary line;
a valve fluidly coupled to the secondary line, wherein the valve is configured to selectively enable the air stream to flow through the secondary line from the primary line to the storage tank;
a first pressure sensor fluidly coupled to the storage tank, wherein the first pressure sensor is configured to output a first signal indicative of a first static pressure in the storage tank;
a second pressure sensor fluidly coupled to the primary line, wherein the second pressure sensor is configured to output a second signal indicative of a second static pressure in the second section of the primary line; and
a controller communicatively coupled to the first pressure sensor, to the second pressure sensor, and to the valve, wherein the controller is configured to instruct the valve to enable the air stream to flow from the primary line into the storage tank until the first static pressure is greater than the second static pressure by a threshold amount.

2. The pneumatic distribution system of claim 1, wherein the second section of the primary line is configured to entrain the granular product output from the storage tank into the air stream.

3. The pneumatic distribution system of claim 1, wherein the valve comprises an electronically actuated valve, and the controller is configured to control the valve using an electronic solenoid.

4. The pneumatic distribution system of claim 1, wherein the controller is a Proportional-Integral-Derivative (PID) controller.

5. The pneumatic distribution system of claim 1, wherein the threshold amount is between 0.125 kPa to 1.246 kPa.

6. The pneumatic distribution system of claim 1, wherein the threshold amount is between 0.125 kPa to 0.249 kPa.

7. A pneumatic distribution system configured to distribute a granular product to an agricultural implement, wherein the pneumatic distribution system comprises:
a primary line configured to pneumatically deliver the granular product to the agricultural implement by guiding an air stream from a first section of the primary line with a larger cross-sectional area to a second section of the primary line with a smaller cross-sectional area;
an air source fluidly coupled to the first section of the primary line, wherein the air source is configured to output the air stream;
a secondary line fluidly coupled between the first section of the primary line and a storage tank configured to store the granular product;
a valve fluidly coupled to the secondary line, wherein the valve is configured to selectively enable the air stream to flow through the secondary line from the primary line to the storage tank;
a first pressure sensor fluidly coupled to the storage tank, wherein the first pressure sensor is configured to output a first signal indicative of a first static pressure in the storage tank;
a second pressure sensor fluidly coupled to the primary line, wherein the second pressure sensor is configured to output a second signal indicative of a second static pressure in the second section of the primary line; and
a controller communicatively coupled to the first pressure sensor, to the second pressure sensor, and to the valve, wherein the controller is configured to instruct the valve to enable the air stream to flow from the primary line into the storage tank until the first static pressure is greater than the second static pressure by a threshold amount.

8. The pneumatic distribution system of claim 7, wherein the valve comprises an electronically actuated valve, and the controller is configured to control the valve using an electronic solenoid.

9. The pneumatic distribution system of claim 7, wherein the controller is a Proportional-Integral-Derivative (PID) controller.

10. The pneumatic distribution system of claim 7, wherein the threshold amount is between 0.125 kPa to 1.246 kPa.

11. The pneumatic distribution system of claim 7, wherein the threshold amount is between 0.125 kPa to 0.249 kPa.

* * * * *